US008053116B2

(12) United States Patent
Seino et al.

(10) Patent No.: US 8,053,116 B2
(45) Date of Patent: Nov. 8, 2011

(54) LITHIUM ION-CONDUCTIVE SOLID ELECTROLYTE

(75) Inventors: Yoshikatsu Seino, Chiba (JP); Kazunori Takada, Ibaraki (JP)

(73) Assignees: Idemitsu Kosan Co., Ltd., Tokyo (JP); National Institute for Materials Science, Tsukuba-shi (JP)

( * ) Notice: Subject to any disclaimer, the term of this patent is extended or adjusted under 35 U.S.C. 154(b) by 1059 days.

(21) Appl. No.: 11/813,710

(22) PCT Filed: Jan. 10, 2006

(86) PCT No.: PCT/JP2006/300124
§ 371 (c)(1),
(2), (4) Date: Oct. 11, 2007

(87) PCT Pub. No.: WO2006/075567
PCT Pub. Date: Jul. 20, 2006

(65) Prior Publication Data
US 2009/0011339 A1    Jan. 8, 2009

(30) Foreign Application Priority Data

Jan. 11, 2005  (JP) ................................ 2005-004511
Aug. 23, 2005  (JP) ................................ 2005-240783

(51) Int. Cl.
*H01M 10/056*  (2010.01)
*C01B 35/08*  (2006.01)

(52) U.S. Cl. ...................................................... 429/322
(58) Field of Classification Search .................... 429/322
See application file for complete search history.

(56) References Cited

U.S. PATENT DOCUMENTS 5,217,826 A * 6/1993 Yamamura et al. ........... 429/319

FOREIGN PATENT DOCUMENTS

| JP | 06 279049 | 10/1994 |
|---|---|---|
| JP | 09 301706 | 11/1997 |
| JP | 10 97811 | 4/1998 |
| JP | 11 86899 | 3/1999 |
| JP | 2000 34134 | 2/2000 |
| JP | 2002 109955 | 4/2002 |

OTHER PUBLICATIONS

Seino et al. "Synthesis and electrochemical properties of $Li_2S$-$B_2S_3$-$Li_4SiO_4$", Solid State Ionics, vol. 177, Issues 26-32, Oct. 2006 (Available online Feb. 20, 2006), pp. 2601-2603.*

* cited by examiner

*Primary Examiner* — Gregg Cantelmo
(74) *Attorney, Agent, or Firm* — Oblon, Spivak, McClelland, Maier & Neustadt, L.L.P.

(57) ABSTRACT

Disclosed is a lithium ion-conductive solid electrolyte exhibiting high lithium ion conductivity even at room temperature which is hardly oxidized and free from problems of toxicity and contains as components lithium (Li) element, boron (B) element, sulfur (S) element, and oxygen (O) element, and the ratio between sulfur element and oxygen element (O/S) is 0.01 to 1.43.

12 Claims, 3 Drawing Sheets

LITHIUM ION-CONDUCTIVE SOLID ELECTROLYTE

This application is a 371 of PCT/JP2006/300124, filed Jan. 10, 2006.

TECHNICAL FIELD

The present invention relates to a lithium ion-conductive solid electrolyte including as components a lithium element, a boron element, a sulfur element, and an oxygen element and having a specific ratio of the sulfur element to the oxygen element, to a lithium ion-conductive solid electrolyte including as components a lithium element, a boron element, a sulfur element, and an oxygen element and having specific X-ray diffraction peaks, to a lithium ion-conductive solid electrolyte having a composition in which a mol % ratio of lithium sulfide ($Li_2S$):diboron trisulfide ($B_2S_3$):compound represented by $Li_aMO_b$ is X(100−Y):(1−X)(100−Y):Y, to a method of producing a solid electrolyte including subjecting sulfide-based glass having the composition described above to heat treatment at 100 to 350° C. [wherein: M represents an element selected from phosphorus, silicon, aluminum, boron, sulfur, germanium, gallium, and indium; a and b each independently represent a number of 1 to 10; X represents a number of 0.5 to 0.9; and Y represents 0.5 to 30 mol %, to a lithium ion-conductive solid electrolyte which is obtained by the production method described above, to a solid electrolyte for a lithium secondary battery using the solid electrolyte described above, and to an all-solid lithium battery which is obtained by using the solid electrolyte for a lithium secondary battery described above.

BACKGROUND ART

In recent years, demand has been increasing for a high-performance lithium secondary battery to be used for a personal digital assistant, a portable electronic device, a domestic small electric energy storage device, a two-wheeled motor vehicle using a motor as a power source, an electric automobile, a hybrid electric automobile, or the like.

In this case, the secondary battery refers to a battery which can be charged and discharged.

As the purpose of use varies, further improvement in safety of the secondary battery and higher performance thereof have been increasingly demanded.

An inorganic solid electrolyte is inflammable by nature and is a highly safe material compared with an organic electrolyte generally used.

However, the inorganic solid electrolyte exhibits slightly degraded electrochemical performance in comparison with that of the organic electrolyte, and thus, the performance of the inorganic solid electrolyte must be further improved.

Conventionally, an electrolyte exhibiting high lithium ion conductivity at room temperature has been substantially limited to an organic electrolyte.

However, a conventional organic electrolyte contains an organic solvent and thus is combustible.

Thus, use of an ion conductive material containing an organic solvent for an electrolyte of a battery may cause leak or firing.

The organic electrolyte is liquid. Thus, not only lithium ions are conducted but also counter anions are conducted. A lithium ion transport number is 1 or less.

Various studies on a sulfur-based solid electrolyte have been conducted conventionally for solving such problems.

For example, in 1980s, there is reported as a lithium ion-conductive solid electrolyte having high ion conductivity sulfide glass having an ion conductivity of $10^{-3}$ S/cm such as LiI—$Li_2S$—$P_2S_5$, LiI—$Li_2S$—$B_2S_3$, or LiI—$Li_2S$—$SiS_2$.

However, such a solid electrolyte is doped with lithium iodide (LiI) for improving the ion conductivity, and is easily subjected to electrochemical oxidation. Thus, production of an all-solid lithium battery operating at 3 V or more involves difficulties.

Further, pentaphosphorus disulfide ($P_2S_5$) to be used as a raw material for the solid electrolyte has problems of toxicity and its industrial use involves difficulties.

DISCLOSURE OF THE INVENTION

The present invention has been made in view of such circumstances, and an object of the present invention is to provide a lithium ion-conductive solid electrolyte exhibiting high lithium conductivity even at room temperature, hardly oxidized, and free from problems of toxicity, a method of producing the solid electrolyte, a solid electrolyte which is obtained by the production method, a solid electrolyte for a lithium secondary battery using the solid electrolyte, and an all-solid lithium battery which is obtained by using the solid electrolyte for a secondary battery.

The inventors of the present invention have conducted extensive studies for attaining the object as described above, and have found that a lithium ion-conductive solid electrolyte having high conductivity can be obtained by: subjecting a raw material mixture including lithium sulfide, diboron trisulfide, and a compound represented by the general formula $Li_aMO_b$ to melt reaction; and rapidly cooling the melt reaction product. Thus, the inventors have completed the present invention.

That is, the present invention is to provide:

1. a lithium ion-conductive solid electrolyte characterized by including as components a lithium (Li) element, a boron (B) element, a sulfur (S) element, and an oxygen (O) element, in which a ratio of the sulfur element to the oxygen element (O/S) is 0.01 to 1.43;

2. a lithium ion-conductive solid electrolyte characterized by including a composition in which a mol % ratio of lithium sulfide ($Li_2S$):diboron trisulfide ($B_2S_3$):compound represented by $Li_aMO_b$ is X(100−Y):(1−X)(100−Y):Y, wherein: M represents an element selected from phosphorus (P), silicon (Si), aluminum (Al), boron (B), sulfur (S), germanium (Ge), gallium (Ga), and indium (In); a and b each independently represent a number of 1 to 10; X represents a number of 0.5 to 0.9; and Y represents 0.5 to 30 mol %;

3. a lithium ion-conductive solid electrolyte characterized by including as components a lithium (Li) element, a boron (B) element, a sulfur (S) element, and an oxygen (O) element, in which X-ray diffraction (CuKα: λ=0.15418 nm) of the lithium ion-conductive solid electrolyte gives diffraction peaks at 2θ=19.540±0.3 deg, 28.640±0.3 deg, and 29.940±0.3 deg;

4. a method of producing a lithium ion-conductive solid electrolyte characterized by including subjecting sulfide-based glass having a composition in which a mol % ratio of lithium sulfide ($Li_2S$):diboron trisulfide ($B_2S_3$):compound represented by $Li_aMO_b$ is X(100−Y):(1−X)(100−Y):Y to heat treatment at 100 to 350° C., wherein: M represents an element selected from phosphorus (P), silicon (Si), aluminum (Al), boron (B), sulfur (S), germanium (Ge), gallium (Ga), and indium (In); a and b each independently represent a number of 1 to 10; X represents a number of 0.5 to 0.9; and Y represents 0.5 to 30 mol %;

5. a method of producing a lithium ion-conductive solid electrolyte according to Item 4 as described above, wherein the compound represented by the general formula $Li_aMO_b$ is selected from lithium silicate, lithium borate, and lithium phosphate;

6. a method of producing a lithium ion-conductive solid electrolyte according to Item 4 or 5 as described above, wherein diboron trisulfide is replaced by a mixture of boron and sulfur elements in a corresponding ratio;

7. a lithium ion-conductive solid electrolyte, which is obtained by the production method according to any one of Items 4 to 6 as described above;

8. a solid electrolyte for a lithium secondary battery, which is obtained by using the lithium ion-conductive solid electrolyte according to any one of Items 1 to 3 and 7 as described above; and 9. an all-solid lithium battery, which is obtained by using the solid electrolyte for a lithium secondary battery according to Item 8.

The lithium ion-conductive solid electrolyte of the present invention has a decomposition voltage of at least 10 V, is an inorganic solid and incombustible, has a lithium ion transport number of 1, and has a very high lithium ion conductivity in the order of $10^{-3}$ S/cm at room temperature.

Thus, the lithium ion-conductive solid electrolyte of the present invention is very appropriate as a solid electrolyte material for a lithium battery.

Further, an all-solid lithium battery using the lithium ion-conductive solid electrolyte of the present invention has high energy density, excellent safety, and excellent charge and discharge cycle properties, and raw materials to be used have no high toxicity.

BEST MODE FOR CARRYING OUT THE INVENTION

Figure 1:
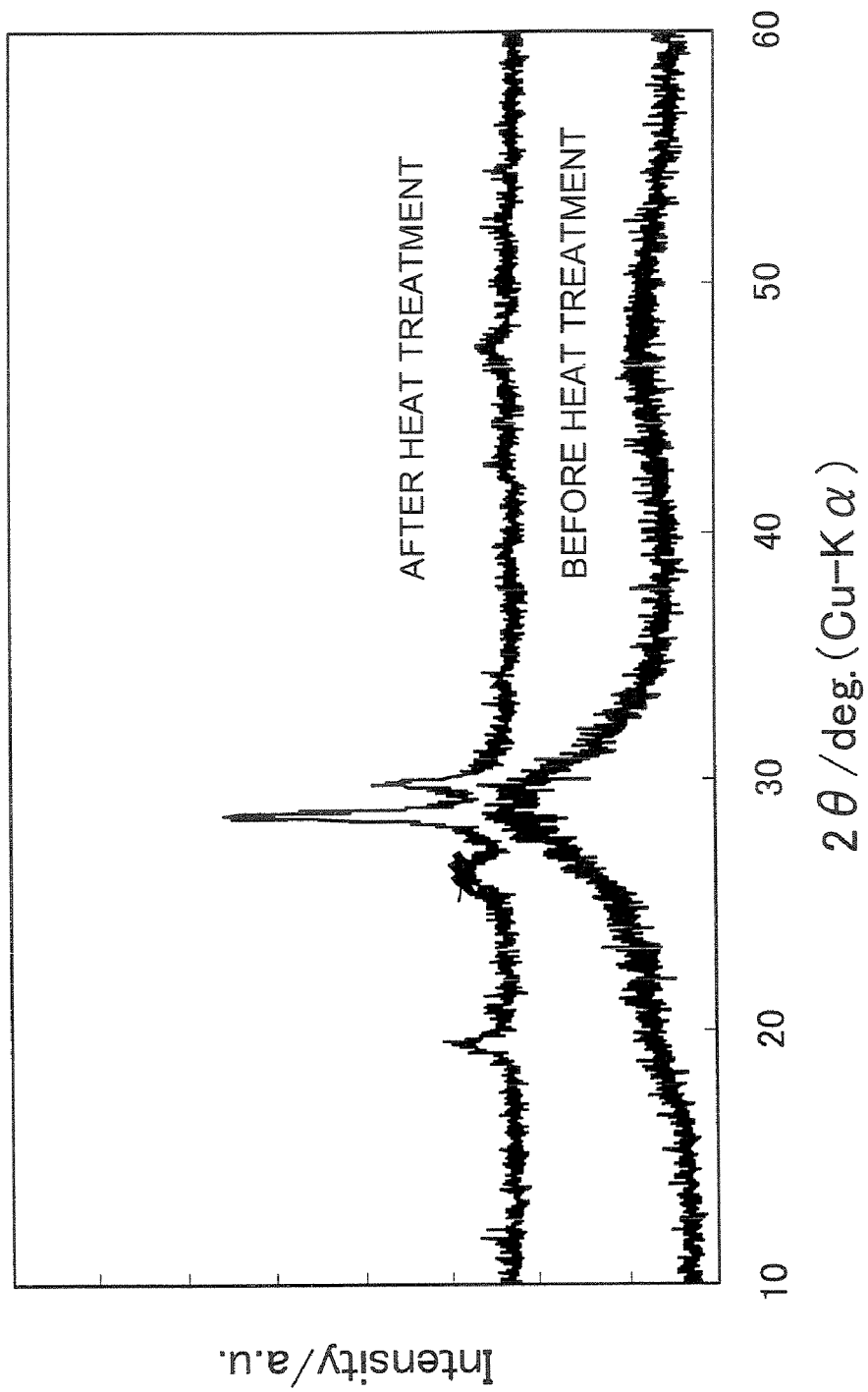
FIG. 1 A diagram showing X-ray diffraction patterns of powder samples of a melt reaction product (before heat treatment) and a heat treated product obtained in Example 1.

A lithium ion-conductive solid electrolyte of the present invention includes as components a lithium element, a boron element, a sulfur element, and an oxygen element, and ratio of the sulfur element to the oxygen element (O/S) is 0.01 to 1.43, preferably 0.03 to 1.2, and more preferably 0.05 to 1.0.

The lithium ion-conductive solid electrolyte includes sulfur-based glass obtained by rapidly cooling a melt reaction product described below, sulfur-based crystallized glass obtained through heat treatment of the glass, and a mixture of sulfur-based glass and sulfur-based crystallized glass in an arbitrary ratio.

Further, the lithium ion-conductive solid electrolyte of the present invention includes a lithium ion-conductive solid electrolyte characterized by including a composition in which a mol % ratio of lithium sulfide ($Li_2S$):compound represented by $Li_aMO_b$ is $X(100-Y)(1-X)(100-Y):Y$, wherein: M represents an element selected from phosphorus (P), silicon (Si), aluminum (Al), boron (B), sulfur (S), germanium (Ge), gallium (Ga), and indium (In); a and b each independently represent a number of 1 to 10; X represents a number of 0.5 to 0.9; and Y represents 0.5 to 30 mol %.

The lithium ion-conductive solid electrolyte includes sulfur-based glass obtained by rapidly cooling a melt reaction product described below, sulfur-based crystallized glass obtained through heat treatment of the glass, and a mixture of sulfur-based glass and sulfur-based crystallized glass in an arbitrary ratio.

Further, a lithium ion-conductive solid electrolyte of the present invention includes as components a lithium element, a boron element, a sulfur element, and an oxygen element, in which X-ray diffraction (CuKα: λ=0.15418 nm) of the lithium ion-conductive solid electrolyte gives diffraction peaks at 2θ=19.540±0.3 deg, 28.640±0.3 deg, and 29.940±0.3 deg.

The lithium ion-conductive solid electrolyte includes sulfur-based glass obtained by rapidly cooling a melt reaction product described below.

Note that the lithium ion-conductive solid electrolyte may contain as another component an element selected from silicon, phosphorus, aluminum, germanium, gallium, and indium added thereto.

The lithium ion-conductive solid electrolyte of the present invention can be produced by: subjecting a raw material mixture having a mol % ratio of lithium sulfide:diboron trisulfide or mixture of boron and sulfur elements in molar ratio corresponding to diboron trisulfide:compound represented by $Li_aMO_b$ of $X(100-Y):(1-X)(100-Y):Y$ to a melt reaction; and rapidly cooling the melt reaction product.

M, a, b, X, and Y are the same as those described above.

The lithium ion-conductive solid electrolyte of the present invention can be produced by: subjecting a raw material mixture having a mol % ratio of lithium sulfide:diboron trisulfide or mixture of boron and sulfur elements in molar ratio corresponding to diboron trisulfide:compound represented by $Li_aMO_b$ of $X(100-Y):(1-X)(100-Y):Y$ to a melt reaction; rapidly cooling the melt reaction product; and subjecting the resultant to heat treatment at 100 to 350° C.

Lithium sulfide to be used in the present invention is not particularly limited, but preferably has high purity.

Diboron trisulfide, boron, and sulfur are not particularly limited, but each preferably have high purity.

The compound represented by the general formula $Li_aMO_b$ (wherein: M represents an element selected from phosphorus, silicon, aluminum, boron, sulfur, germanium, gallium, and indium; and a and b each independently represent a number of 1 to 10) is not particularly limited, but preferably has high purity.

Preferred examples of the compound represented by the general formula $Li_aMO_b$ include lithium silicate ($Li_4SO_4$), lithium borate ($LiBO_2$), and lithium phosphate ($Li_3PO_4$).

The compound containing an element M excluding silicon and selected from phosphorus, aluminum, boron, germanium, gallium, and indium is not particularly limited as long as it has a crystal structure similar to that of lithium silicate, lithium borate, or lithium phosphate.

Examples of such a compound include $LiAlO_2$, $Li_3BO_3$, and $Li_2SO_4$.

Diboron trisulfide, boron, sulfur, and the compound represented by the general formula $Li_aMO_b$ may be commercially available products as long as they have high purity.

In the present invention, a content of the compound represented by the general formula $Li_aMO_b$ in the raw material mixture is 0.5 to 30 mol %, preferably 1 to 20 mol %, and more preferably 1 to 15 mol %.

A content of lithium sulfide is preferably 50 to 99 mol %, more preferably 55 to 85 mol %, and furthermore preferably 60 to 80 mol %, and the balance includes diboron trisulfide or the mixture of boron and sulfur elements in a molar ratio corresponding to diboron trisulfide.

A melt reaction temperature of the above-mentioned mixture is generally 400 to 1,000° C., preferably 600 to 1,000° C., and more preferably 700 to 1,000° C., and a melt reaction time is generally between 0.1 to 12 hours, and preferably between 0.5 to 10 hours.

A rapid cooling temperature of the melt reaction product is generally 10° C. or lower, and preferably 0° C. or lower, and a cooling rate thereof is about 0.01 to 10,000 K/sec, and preferably 1 to 10,000 K/sec.

The thus-obtained melt reaction product (sulfur-based glass) is vitreous (completely amorphous) and generally has an ionic conductivity of 0.5 to $10 \times 10^{-4}$ (S/cm).

The lithium ion-conductive inorganic solid electrolyte of the present invention can be produced by subjecting the melt reaction product (sulfur-based glass) of the present invention to heat treatment.

The heat treatment is performed generally at about 100 to 350° C., preferably 150 to 340° C., and more preferably 180 to 330° C. A heat treatment time varies depending on the heat treatment temperature, but is generally between 0.01 to 240 hours, and preferably between 0.1 to 24 hours.

A partially or completely crystallized solid electrolyte can be obtained through the heat treatment.

The thus-obtained solid electrolyte generally has an ionic conductivity of $3.0 \times 10^{-4}$ to $3.0 \times 10^{-3}$ (S/cm).

A method of producing lithium sulfide to be used in the present invention is not particularly limited as long as it is a method capable of reducing the above-mentioned impurities.

For example, lithium sulfide may be obtained by purifying lithium sulfide produced by the following methods.

Of the following production methods, method a or b is particularly preferred.

a. A method involving: reacting lithium hydroxide and hydrogen sulfide in an aprotic organic solvent at 0 to 150° C. to form lithium hydrosulfide; and removing hydrogen sulfide from the reaction liquid at 150 to 200° C. (JP 07-330312 A).

b. A method involving reacting lithium hydroxide and hydrogen sulfide in an aprotic organic solvent at 150 to 200° C. to form lithium sulfide directly (JP 07-330312 A).

c. A method involving reacting lithium hydroxide and a gaseous sulfur source at a temperature of 130 to 445° C. (JP 09-283156 A).

A method of purifying lithium sulfide obtained as described above is not particularly limited A preferred example of the purification method is a method described in Japanese Patent Application No. 2003-363403.

Specifically, lithium sulfide obtained as described above is washed with an organic solvent at a temperature of 100° C. or higher.

The organic solvent is used at a temperature of 100° C. or higher because an impurity lithium N-methylaminobutyrate (LMAB), which is produced in the case where an organic solvent to be used for production of lithium sulfide is N-methyl-2-pyrrolidone (NMP), dissolves in an organic solvent at a temperature of 100° C. LMAB is dissolved in an organic solvent for washing to be removed from lithium sulfide.

The organic solvent to be used for washing is preferably an aprotic polar solvent. More preferably, an aprotic organic solvent to be used for production of lithium sulfide is identical to an aprotic polar organic solvent to be used for washing.

Examples of the aprotic polar organic solvent to be preferably used for washing include aprotic polar organic compounds such as an amide compound, a lactam compound, a urea compound, an organic sulfur compound, and a cyclic organic phosphorus compound. The aprotic polar organic solvent may preferably be used as a single solvent or a mixed solvent.

Of the aprotic polar organic solvents, the amide compound includes N,N-dimethylformamide, N,N-diethylformamide, N,N-dimethylacetamide, N,N-dipropylacetamide, N,N-dimethylbenzoic amide, and the like.

In addition, examples of the above lactam compound include: N-alkylcaprolactams such as caprolactam, N-methylcaprolactam, N-ethylcaprolactam, N-isopropylcaprolactam, N-isobutylcaprolactam, N-normalpropylcaprolactam, N-normalbutylcaprolactam, and N-cyclohexylcaprolactam; N-methyl-2-pyrrolidone (NMP); N-ethyl-2-pyrrolidone; N-isopropyl-2-pyrrolidone; N-isobutyl-2-pyrrolidone; N-normalpropyl-2-pyrrolidone; N-normalbutyl-2-pyrrolidone; N-cyclohexyl-2-pyrrolidone; N-methyl-3-methyl-2-pyrrolidone; N-ethyl-3-methyl-2-pyrrolidone; N-methyl-3,4,5-trimethyl-2-pyrrolidone; N-methyl-2-piperidone; N-ethyl-2-piperidone; N-isopropyl-2-piperidone; N-methyl-6-methyl-2-piperidone; and N-methyl-3-ethyl-2-piperidone.

Examples of the organic sulfur compound include dimethylsulfoxide, diethylsulfoxide, diphenylene sulfone, 1-methyl-1-oxosulfolane, and 1-phenyl-1-oxosulfolane.

Various aprotic organic compounds may be used alone, as a mixture of two or more kinds thereof, or as a mixture with another solvent component which causes no problem for attaining the object of the present invention as the aprotic organic solvent.

Of the various aprotic polar organic solvents, N-alkylcaprolactam and N-alkylpyrrolidone are preferred, and N-methyl-2-pyrrolidone (NMP) is particularly preferred.

An amount of the organic solvent to be used for washing is not particularly limited. The number of washing is not particularly limited, but washing is preferably conducted twice or more.

Washing is preferably conducted under an inert gas such as nitrogen or argon.

Washed lithium sulfide is dried at a temperature of a boiling point of the aprotic organic solvent used for washing or higher, in a stream of an inert gas such as nitrogen, under normal pressure or reduced pressure, and for 5 min or more, preferably about 2 to 3 hours or more, to thereby obtain high purity lithium sulfide to be used in the present invention.

The solid electrolyte of the present invention having excellent properties as described above is used, and thus an all-solid lithium battery having excellent long-term stability can be obtained.

Examples of a negative electrode active material of the all-solid lithium battery in the present invention include carbon, indium, lithium, LiAl, $LiWO_2$, $LiMoO_2$, and $LiTiS_2$. Indium is preferred.

Examples of a positive electrode active material include: a lithium metallate such as $LiCoO_2$, $LiNiO_2$, and $LiMn_2O_4$; $MnO_2$; and $V_2O_5$. $LiCoO_2$ is preferred.

A method of producing an all-solid lithium battery using the lithium ion-conductive solid electrolyte obtained by the method of the present invention may employ a conventionally known method.

For example, in an all-solid lithium battery including a sealed dead plate, an insulating packing, electrodes, a positive plate, a positive lead, a negative plate, a negative lead, a solid electrolyte, and an insulating ring in a battery case, the solid electrolyte may be formed into a sheet shape and incorporated into the battery.

Examples of a shape of the all-solid lithium battery include a coin, a button, a sheet, a laminate, a cylindrical shape, a flat shape, a rectangular shape, and a large shape to be used for an electric automobile or the like.

EXAMPLES

Next, the present invention will be described more specifically by referring to examples and comparative examples, but the present invention is not limited to the examples in any way.

Reference Example 1

(1) Production of Lithium Sulfide

Lithium sulfide was produced by a method according to a first embodiment (two-step method) of JP 07-330312 A.

Specifically, 3,326.4 g (33.6 mol) of N-methyl-2-pyrrolidone (NMP) and 287.4 g (12 mol) of lithium hydroxide were charged into a 10-L autoclave equipped with a stirring blade, and a liquid mixture was stirred at 300 rpm and heated to 130° C.

After heating, hydrogen sulfide was blown into the liquid mixture at a supply rate of 3 l/min for 2 hours.

Next, the reaction liquid was heated in a stream of nitrogen (200 cm³/min) such that hydrogen sulfide was partially removed from reacted hydrogen sulfide.

Water produced as a by-product of the reaction of the hydrogen sulfide and lithium hydroxide started to evaporate with heating, and the water was condensed by a condenser and removed out of the system.

The temperature of the reaction liquid increased with distillation of water out of the system. Heating was stopped at a temperature of 180° C., and the reaction liquid was maintained at a constant temperature.

After completion of the reaction of removing hydrogen sulfide (about 80 min), the reaction was stopped to thereby obtain lithium sulfide.

(2) Purification of Lithium Sulfide

NMP in 500 mL of the slurry reaction solution (NMP-lithium sulfide slurry) obtained in the above section (1) was decanted, and 100 mL of dehydrated NMP was added. The whole was stirred at 105° C. for about 1 hour.

NMP was decanted at this temperature.

Additional 100 mL of NMP was added, and the whole was stirred at 105° C. for 1 hour. NMP was decanted at this temperature. The same operation was repeated four times in total.

After the decantation, the resultant was dried at 230° C. under reduced pressure for 3 hours, thereby obtaining a high purity lithium sulfide.

Example 1

0.2903 g (0.00632 mol) of high purity lithium sulfide ($Li_2S$) of Reference Example 1, 0.3204 g (0.00272 mol) of diboron trisulfide ($B_2S_3$), and 0.0562 g (0.00047 mol) of lithium silicate ($Li_4SiO_4$) were mixed sufficiently in a mortar, pelletized, and charged into a quartz glass tube subjected to carbon coating. Then, the quartz tube was sealed under vacuum.

Next, the quartz tube was charged into a vertical reaction furnace, and heated to 800° C. over 4 hours for a melt reaction at this temperature for 2 hours.

After completion of the reaction, the quartz tube was charged into ice water for rapid cooling.

The quartz tube was opened, and X-ray diffraction of a powder sample of the obtained melt reaction product (sulfide-based glass) was conducted. Results confirmed that peaks of lithium sulfide, diboron trisulfide, and lithium silicate disappeared and vitrification progressed.

This powder sample was subjected to heat treatment at 215° C. for 30 minutes.

X-ray diffraction of a powder sample of the obtained heat treated product (sulfide-based crystallized glass) was conducted. Results confirmed that crystallization partially progressed (see FIG. 1).

Electrical conductivity of the powder sample of the heat treated product was measured by an alternating current impedance method. As a result, an ion conductivity at room temperature was $10.1 \times 10^{-4}$ S/cm.

Similarly, X-ray diffraction of the powder sample of the melted reaction product (before heat treatment) was conducted (see FIG. 1).

The electrical conductivity of the powder sample of the melted reaction product (before heat treatment) was measured As a result, the ion conductivity at room temperature was $3.5 \times 10^{-4}$ S/cm.

Table 1 shows the obtained results. Note that in Table 1, the term "untreated" refers to "before heat treatment".

Example 2

A reaction and an operation were conducted in the same manner as in Example 1 except that the amount of lithium silicate was changed to 0.0336 g (0.00028 mol).

Table 1 shows the obtained results.

Example 3

A reaction and an operation were conducted in the same manner as in Example 1 except that the amount of lithium silicate was changed to 0.0456 g (0.00038 mol).

Table 1 shows the obtained results.

Example 4

A reaction and an operation were conducted in the same manner as in Example 1 except that the amount of lithium silicate was changed to 0.0692 g (0.00058 mol).

Table 1 shows the obtained results.

Example 5

A reaction and an operation were conducted in the same manner as in Example 1 except that the amount of lithium silicate was changed to 0.0815 g (0.000688 mol).

Table 1 shows the obtained results. Note that in Table 1, the term "untreated" refers to "before heat treatment".

Example 6

A cyclic voltammogram was measured by using the heat treated product (sulfide-based crystallized glass) synthesized in Example at a scanning rate of 10 mV/sec in a range of −0.5 to 10 V.

Figure 2:
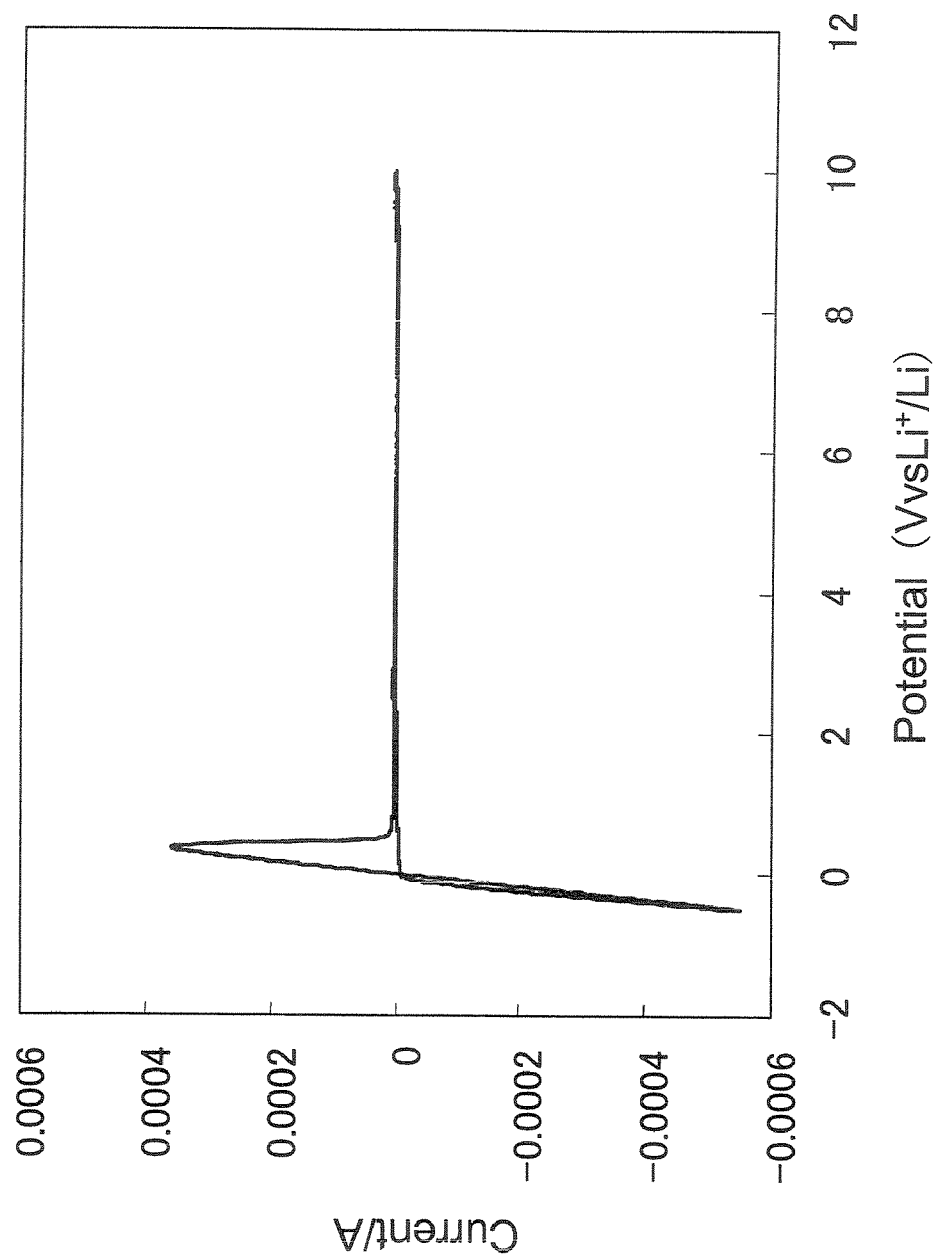
FIG. 2 A diagram showing a cyclic voltammogram of a heat treated product of Example 6.

FIG. 2 shows the results.

Note that a vertical axis represents current/A, and a horizontal axis represents potential (V vs. $Li^+/Li$)

Example 7

A lithium battery was produced by using the heat treated product (sulfur-based crystallized glass) synthesized in Example 4, lithium cobaltate ($LiCoO_2$) as a positive electrode active material, and indium (In) as a negative electrode active material, and battery properties were evaluated.

The heat treated product (165.5 mg) was provided between the negative electrode active material (56.6 mg) and the positive electrode active material (11.9 mg), and the whole was molded into pellets of three layers, to thereby prepare a measurement cell.

Charge and discharge of the measurement cell were studied at an upper limit voltage of charge and discharge of 3.7 V, a lower limit voltage of charge and discharge of 2 V, and a current density of 12.7 $\mu A \cdot cm^{-2}$.

Figure 3:
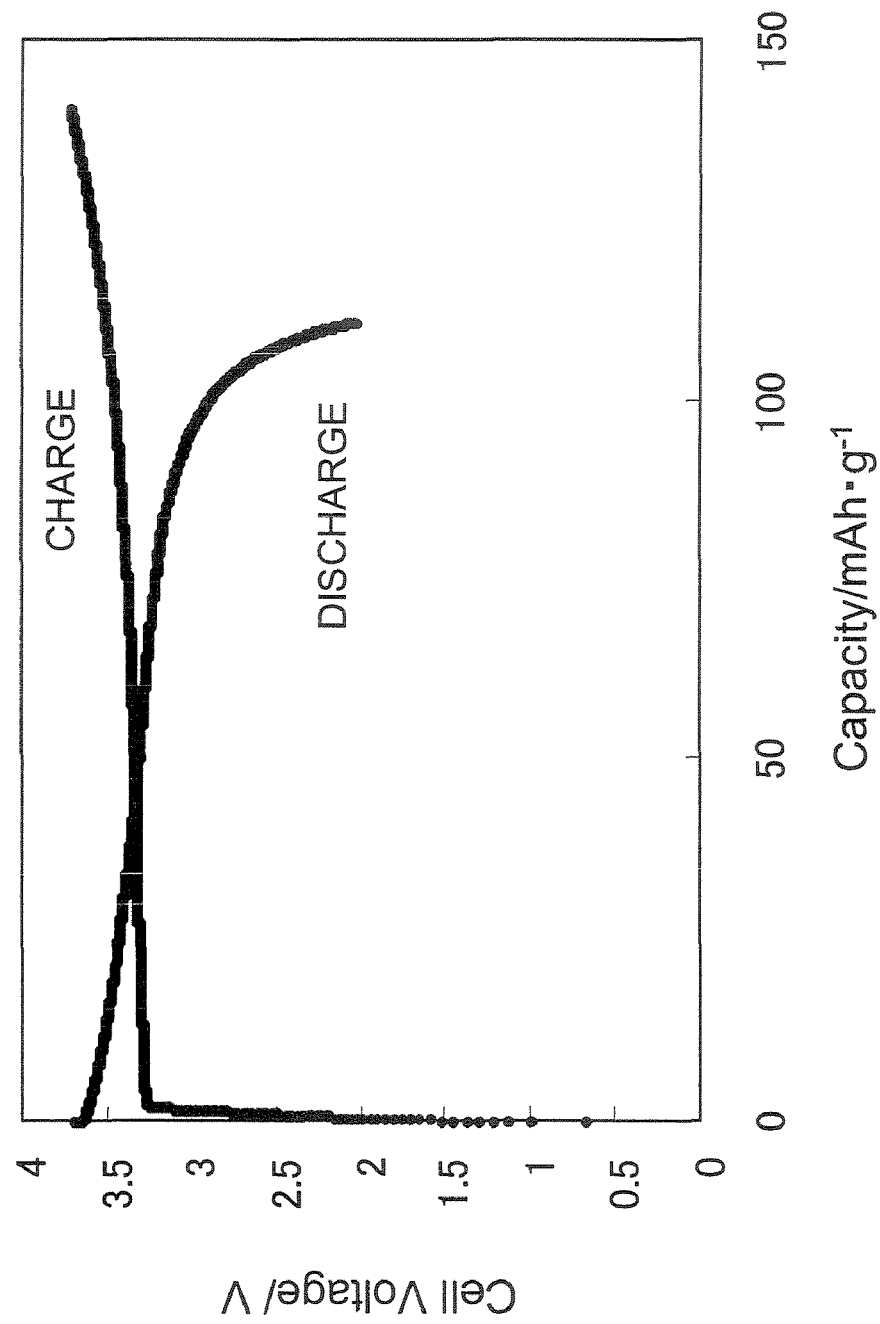
FIG. 3 A diagram showing charge and discharge properties of a battery obtained in Example 7.

FIG. 3 shows the obtained results.

Note that a vertical axis represents cell voltage/V, and a horizontal axis represents a capacity/$mAh \cdot g^{-1}$ with respect to 1 g of lithium cobaltate.

Comparative Example 1

A reaction and an operation were conducted in the same manner as in Example 1 except that no lithium silicate was added.

Table 1 shows the obtained results.

Comparative Example 2

A reaction and an operation were conducted in the same manner as in Example 1 except that no lithium silicate was added, 0.3489 g (0.00759 mol) of high purity lithium sulfide was used, and 0.3396 g (0.00288 mol) of diboron trisulfide was used.

Table 1 shows the obtained results.

Comparative Example 3

A reaction and an operation were conducted in the same manner as in Example 1 except that no lithium silicate was added, 0.2651 g (0.00577 mol) of high purity lithium sulfide was used, and 0.3349 g (0.00284 mol) of diboron trisulfide was used.

Table 1 shows the obtained results.

TABLE 1

|  |  | Composition (mol %) | | | Ion conductivity |
|---|---|---|---|---|---|
|  |  | $Li_2S$ | $B_2S_3$ | $Li_4SiO_4$ | ($\times 10^{-4}$ S/cm) |
| Example 1 | Untreated | 66.4 | 28.6 | 5 | 3.5 |
|  | Heat treated | 66.4 | 28.6 | 5 | 10.1 |
| Example 2 | Untreated | 67.8 | 29.2 | 3 | 3.4 |
|  | Heat treated | 67.8 | 29.2 | 3 | 4.4 |
| Example 3 | Untreated | 67.1 | 28.9 | 4 | 2.4 |
|  | Heat treated | 67.1 | 28.9 | 4 | 5.1 |
| Example 4 | Untreated | 65.7 | 28.3 | 6 | 4.0 |
|  | Heat treated | 65.7 | 28.3 | 6 | 6.9 |
| Example 5 | Untreated | 65.0 | 28.0 | 7 | 2.6 |
|  | Heat treated | 65.0 | 28.0 | 7 | 4.1 |
| Comparative example 1 | Untreated | 70.0 | 30.0 |  | 2.1 |
|  | Heat treated | 70.0 | 30.0 |  | 0.033 |
| Comparative example 2 | Untreated | 72.5 | 27.5 |  | 2.4 |
|  | Heat treated | 72.5 | 27.5 |  | 0.026 |
| Comparative example 3 | Untreated | 67.0 | 33.0 |  | 2.3 |
|  | Heat treated | 67.0 | 30.0 |  | 0.030 |

Example 8

0.2903 g (0.00632 mol) of high purity lithium sulfide ($Li_2S$) of Reference Example 1, 0.3204 g (0.00272 mol) of diboron trisulfide ($B_2S_3$), and 0.0338 g (0.00068 mol) of lithium borate ($LiBO_2$) were mixed sufficiently in a mortar, pelletized, and charged into a quartz glass tube subjected to carbon coating. Then, the quartz tube was sealed under vacuum.

Next, the quartz tube was charged into a vertical reaction furnace, and heated to 800° C. over 4 hours for a melt reaction at this temperature for 2 hours.

After completion of the reaction, the quartz tube was charged into ice water for rapid cooling.

The quartz tube was opened, and X-ray diffraction of a powder sample of the obtained melt reaction product (sulfide-based glass) was conducted. Results confirmed that no clear diffraction peaks were observed and the sample was vitrified.

The electrical conductivity of the powder sample of the melt reaction product was measured by an alternating current impedance method. As a result, the ion conductivity at room temperature was $6.7 \times 10^{-4}$ S/cm.

Table 2 shows the obtained results. Note that in Table 2, the term "untreated" refers to "before heat treatment".

Example 9

A reaction and an operation were conducted in the same manner as in Example 8 except that the amount of lithium borate in Example 8 was changed to 0.0443 g (0.00089 mol).

X-ray diffraction of a powder sample of the obtained melt reaction product (sulfide-based glass) was conducted. Results confirmed that no clear diffraction peaks were observed and the sample was vitrified.

The electrical conductivity of the powder sample of the melt reaction product was measured by an alternating current impedance method. As a result, the ion conductivity at room temperature was $9.5 \times 10^{-4}$ S/cm.

Table 2 shows the obtained results.

Example 10

A reaction and an operation were conducted in the same manner as in Example 8 except that lithium borate was changed to lithium phosphate ($Li_3PO_4$) and its use amount was 0.0534 g (0.000475 mol).

X-ray diffraction of a powder sample of the obtained melt reaction product (sulfide-based glass; before heat treatment) was conducted. Results confirmed that no clear diffraction peaks were observed and the sample was vitrified.

The electrical conductivity of the powder sample of the melt reaction product was measured by an alternating current impedance method. As a result, the ion conductivity at room temperature was $8.1 \times 10^{-4}$ S/cm.

The powder sample of the melt reaction product (before heat treatment) was subjected to heat treatment at 230° C. for 30 minutes.

The electrical conductivity of the powder sample of the obtained heat treated product (sulfide-based crystallized glass) was measured. As a result, the ion conductivity at room temperature was $22.0 \times 10^{-4}$ S/cm. Table 2 shows the obtained results.

Example 11

A reaction and an operation were conducted in the same manner as in Example 8 except that lithium borate was changed to lithium phosphate ($Li_3PO_4$) and its use amount was 0.0787 g (0.00068 mol).

X-ray diffraction of a powder sample of the obtained melt reaction product (sulfide-based glass; before heat treatment)

was conducted. Results confirmed that no clear diffraction peaks were observed and the sample was vitrified.

The electrical conductivity of the powder sample of the melt reaction product was measured by an alternating current impedance method. As a result, the ion conductivity at room temperature was $8.0 \times 10^{-4}$ S/cm.

The powder sample of the melt reaction product (before heat treatment) was subjected to heat treatment at 230° C. for 30 minutes.

The electrical conductivity of the powder sample of the obtained heat treated product (sulfide-based crystallized glass) was measured. As a result, the ion conductivity at room temperature was $24.0 \times 10^{-4}$ S/cm.

Table 2 shows the obtained results.

Example 12

A reaction and an operation were conducted in the same manner as in Example 8 except that lithium borate was changed to lithium phosphate ($Li_3PO_4$) and its use amount was 0.0324 g (0.00028 mol).

X-ray diffraction of a powder sample of the obtained melt reaction product (sulfide-based glass; before heat treatment) was conducted. Results confirmed that no clear diffraction peaks were observed and the sample was vitrified.

The electrical conductivity of the powder sample of the melt reaction product was measured by an alternating current impedance method. As a result, the ion conductivity at room temperature was $6.1 \times 10^{-4}$ S/cm.

The powder sample of the melt reaction product (before heat treatment) was subjected to heat treatment at 230° C. for 30 minutes.

The electrical conductivity of the powder sample of the obtained heat treated product (sulfide-based crystallized glass) was measured. As a result, the ion conductivity at room temperature was $19.0 \times 10^{-4}$ S/cm.

Table 2 shows the obtained results. Note that in Table 2, the term "untreated" refers to "before heat treatment".

TABLE 2

|  |  | Composition (mol %) |  |  |  | Ion conductivity ($\times 10^{-4}$ S/cm) |
|---|---|---|---|---|---|---|
|  |  | $Li_2S$ | $B_2S_3$ | $LiBO_2 4$ | $Li_3PO_4$ |  |
| Example 8 | Untreated | 65.0 | 28.0 | 7.0 |  | 6.7 |
| Example 9 | Untreated | 63.7 | 27.3 | 9.0 |  | 9.5 |
| Example 10 | Untreated | 67.8 | 29.2 |  | 3.0 | 8.1 |
|  | Heat treated | 67.8 | 29.2 |  | 3.0 | 22.0 |
| Example 11 | Untreated | 66.4 | 28.6 |  | 5.0 | 8.0 |
|  | Heat treated | 66.4 | 28.6 |  | 5.0 | 24.0 |
| Example 12 | Untreated | 65.0 | 28.0 |  | 7.0 | 6.1 |
|  | Heat treated | 65.0 | 28.0 |  | 7.0 | 19.0 |

INDUSTRIAL APPLICABILITY

The lithium ion-conductive solid electrolyte obtained by the method of the present invention can be used for the all-solid lithium battery of a personal digital assistant, a portable electronic device, a domestic small electric energy storage device, a two-wheeled motor vehicle using a motor as a power source, an electric automobile, a hybrid electric automobile, or the like, but its use is not limited to the all-solid lithium battery described above.

The invention claimed is:

1. A lithium ion-conductive solid electrolyte comprising as components a lithium (Li) element, a boron (B) element, a sulfur (S) element, and an oxygen (O) element, wherein X-ray diffraction (CuKα: λ=0.15418 nm) of the lithium ion-conductive solid electrolyte gives diffraction peaks at 2θ=19.540±0.3 deg, 28.640±0.3 deg, and 29.940±0.3 deg.

2. The lithium ion-conductive solid electrolyte as claimed in claim 1, wherein a ratio of the sulfur element to the oxygen element (O/S) is 0.01 to 1.43.

3. A method of producing the lithium ion-conductive solid electrolyte according to claim 1, comprising subjecting sulfide-based glass having a composition in which a mol % ratio of lithium sulfide ($Li_2S$):diboron trisulfide ($B_2S_3$):compound represented by $Li_aMO_b$ is $$X(100-Y):(1-X)(100-Y):Y$$

to heat treatment at 100 to 350° C., where M represents an element selected from phosphorus (P), silicon (Si), aluminum (Al), boron (B), sulfur (S), germanium (Ge), gallium (Ga), and indium (In); a and b each independently represent a number of 1 to 10; X represents a number of 0.5 to 0.9; and Y represents 0.5 to 30 mol %.

4. The method of producing a lithium ion-conductive solid electrolyte according to claim 3, wherein the compound represented by the general formula $Li_aMO_b$ is selected from lithium silicate, lithium borate, and lithium phosphate.

5. The lithium ion-conductive solid electrolyte as claimed in claim 2, wherein a ratio of the sulfur element to the oxygen element (O/S) is 0.03 to 1.2.

6. The lithium ion-conductive solid electrolyte as claimed in claim 2, wherein a ratio of the sulfur element to the oxygen element (O/S) is 0.05 to 1.0.

7. A method according to claim 3, comprising subjecting said sulfide-based glass to heat treatment at 150 to 340° C.

8. A method according to claim 3, comprising subjecting said sulfide-based glass to heat treatment at 180 to 330° C.

9. A method according to claim 3, comprising subjecting said sulfide-based glass to said heat treatment for 0.1 to 24 hours.

10. A method according to claim 8, comprising subjecting said sulfide-based glass to said heat treatment for 0.1 to 24 hours.

11. The lithium ion-conductive solid electrolyte as claimed in claim 1, wherein the solid electrolyte has an ionic conductivity of $3.0 \times 10^{-4}$ to $3.0 \times 10^{-3}$ (S/cm).

12. The lithium ion-conductive solid electrolyte as claimed in claim 2, wherein the solid electrolyte has an ionic conductivity of $3.0 \times 10^{-4}$ to $3.0 \times 10^{-3}$ (S/cm).

* * * * *